United States Patent
Lv et al.

(10) Patent No.: US 9,811,243 B2
(45) Date of Patent: Nov. 7, 2017

(54) NETWORK TERMINAL AND DISPLAY METHOD THEREFOR

(71) Applicant: ZTE Corporation, Shenzhen, Guangdong (CN)

(72) Inventors: Guosheng Lv, Shenzhen (CN); Shiwei Liu, Shenzhen (CN); Cuina Zhao, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 97 days.

(21) Appl. No.: 14/646,068

(22) PCT Filed: Aug. 28, 2013

(86) PCT No.: PCT/CN2013/082474
§ 371 (c)(1),
(2) Date: Jul. 7, 2015

(87) PCT Pub. No.: WO2014/079249
PCT Pub. Date: May 30, 2014

(65) Prior Publication Data
US 2015/0312098 A1 Oct. 29, 2015

(30) Foreign Application Priority Data
Nov. 20, 2012 (CN) .......................... 2012 1 0472428

(51) Int. Cl.
*G06F 3/0482* (2013.01)
*G06F 3/048* (2013.01)
(Continued)

(52) U.S. Cl.
CPC ............ *G06F 3/0482* (2013.01); *G06F 3/048* (2013.01); *H04L 41/00* (2013.01);
(Continued)

(58) Field of Classification Search
CPC ......... G06F 17/30056; G06F 17/30905; G06F 3/048; G06F 3/0481; G06F 3/0482
See application file for complete search history.

(56) References Cited

U.S. PATENT DOCUMENTS 8,620,136 B1 * 12/2013 Malegaonkar ......... H04N 5/781
386/239
8,769,691 B1 * 7/2014 Hsueh ................. H04L 63/1441
726/23
(Continued)

FOREIGN PATENT DOCUMENTS

CN 1525692 A 9/2004
CN 1533188 A 9/2004
(Continued)

OTHER PUBLICATIONS

International Search Report in international application No. PCT/CN2013/082474 , mailed on Dec. 5, 2013.
(Continued)

*Primary Examiner* — Raj Jain
(74) *Attorney, Agent, or Firm* — Oppedahl Patent Law Firm LLC

(57) ABSTRACT

Disclosed is a display method for a network terminal. The method includes that: a network terminal tracks and acquires network connection startup information and VOIP application information, and displays the information; the network terminal receives a running information query instruction from a user, acquires the running information required by the running information query instruction and displays the running information. Also disclosed at the same time is a network terminal. The technical solution of embodiments of the disclosure can be used to promptly and intuitively acquire the specific startup and running information of the network terminal, and can conveniently and quickly perform troubleshooting without accessing the network terminal
(Continued)

through other terminal equipment. Moreover, a user can intuitively view and modify the management configuration information of the network terminal. The operation is simple and convenient, which improves the user experience.

20 Claims, 1 Drawing Sheet

(51) Int. Cl.
*H04L 12/24* (2006.01)
*H04M 7/00* (2006.01)

(52) U.S. Cl.
CPC ...... *H04L 41/0813* (2013.01); *H04L 41/0853* (2013.01); *H04M 7/006* (2013.01)

(56) References Cited

U.S. PATENT DOCUMENTS

| | | | | |
|---|---|---|---|---|
| 8,826,131 | B2* | 9/2014 | Suito | G11B 19/025 386/291 |
| 2002/0075297 | A1 | 6/2002 | Boulter | |
| 2003/0072330 | A1 | 4/2003 | Yang | |
| 2006/0187890 | A1 | 8/2006 | Lin | |
| 2007/0106724 | A1* | 5/2007 | Gorti | G06Q 10/10 709/204 |
| 2007/0183448 | A1* | 8/2007 | Ochiai | H04N 1/00222 370/463 |
| 2011/0141925 | A1 | 6/2011 | Velenko | |
| 2011/0279862 | A1* | 11/2011 | Mori | G06F 3/1205 358/1.15 |
| 2012/0230324 | A1 | 9/2012 | Gong | |
| 2012/0239916 | A1 | 9/2012 | Malasani | |
| 2015/0312098 | A1* | 10/2015 | Lv | H04L 41/0813 370/254 |

FOREIGN PATENT DOCUMENTS

| | | | |
|---|---|---|---|
| CN | 1536817 | A | 10/2004 |
| CN | 1996906 | A | 7/2007 |
| CN | 2929836 | Y | 8/2007 |
| CN | 101076234 | A | 11/2007 |
| CN | 101114193 | A | 1/2008 |
| CN | 101115057 | A | 1/2008 |
| CN | 101483563 | A | 7/2009 |
| CN | 101639800 | | 2/2010 |
| CN | 101699555 | A | 4/2010 |
| CN | 202153744 | U | 2/2012 |
| CN | 102571638 | A | 7/2012 |
| CN | 202353597 | U | 7/2012 |
| EP | 2490374 | A | 8/2012 |
| GB | 2476077 | A | 6/2011 |
| JP | 2002185527 | A | 6/2002 |
| JP | 2006173768 | A | 6/2006 |
| JP | 2006245655 | A | 9/2006 |
| JP | 2008278085 | A | 11/2008 |
| JP | 2010098343 | A | 4/2010 |
| TW | M327128 | U | 2/2008 |

OTHER PUBLICATIONS

English Translation of the Written Opinion of the International Search Authority in international application No. PCT/CN2013/082474, mailed on Dec. 5, 2013.

Supplementary European Search Report in European application No. 13857003.1, dated Oct. 26, 2015.

* cited by examiner

NETWORK TERMINAL AND DISPLAY METHOD THEREFOR

TECHNICAL FIELD

The disclosure relates to display technology of network communications, in particular to a network terminal and a display method for the network terminal.

BACKGROUND

With the improvement of network bandwidth and the continuous development of home network intelligent technology, people have an increasingly higher demand on the visualization and intelligence of a network terminal product. In the future, the network terminal may evolve from one led by a basic service into a multifunctional and multiservice network platform showing user individuality. As an important component of a home network, the network terminal mainly provides home equipment with network access and Voice Over Internet Protocol (VOIP) functions.

To acquire the running information of the conventional network terminal, it is necessary to access a gateway address of the network terminal through other terminal equipment and cooperate with the on/off state of a Light Emitting Diode (LED) indicator lamp of the network terminal. The detailed running information of the network terminal cannot be acquired only through the LED indicator lamp when the network terminal is not connected with other terminal equipment, so that the network terminal cannot be operated conveniently. In particular, when a fault occurs, for example, when the network cannot be accessed due to an error in network parameter configuration, a fault point cannot be positioned quickly through the LED indicator lamp, which increases the costs for querying and troubleshooting the fault.

SUMMARY

In view of this, embodiments of the disclosure provide a network terminal and a display method for the network terminal, so as to at least solve the problem that the existing network terminal cannot be operated conveniently since the running information of the network terminal cannot be viewed through the LED indicator lamp when the gateway address of the network terminal cannot be accessed through other terminal equipment.

The technical solution of the embodiment of the disclosure is implemented as follows.

An embodiment of the disclosure provides a display method for a network terminal, which includes the following steps:

the network terminal tracks and acquires network connection startup information and VOIP application information, and displays the information; and the network terminal receives a running information query instruction input by a user, acquires the running information required by the running information query instruction, and displays the running information.

Preferably, the method further includes that:

the network terminal displays local management configuration information, receives a management configuration instruction input by the user, and updates the local management configuration information according to the management configuration instruction.

Preferably, the management configuration instruction includes a user management instruction of the network terminal and a network parameter configuration instruction of the network terminal.

Preferably, the running information required by the running information query instruction includes network connection status information, network connection traffic, a number of network terminal access users, a VOIP application call record, and user account information.

Preferably, when the running information required by the running information query instruction is the user account information, the method further includes that:

the network terminal asks an Internet Service Provider (ISP) server for the user account information, and displays the user account information after the ISP server returns the user account information.

An embodiment of the disclosure provides a network terminal, which includes a display module, a Graphical User Interface (GUI) management module, a tracking and acquiring module, and an input module.

The tracking and acquiring module is configured to track and acquire network connection startup information, VOIP application information, and the running information required by a running information query instruction received by the GUI management module; and the GUI management module is configured to: receive the running information query instruction from a user through the input module; control the display module to display the network connection startup information and the VOIP application information acquired by the tracking and acquiring module; and control the display module to display the running information required by the running information query instruction, which is tracked and acquired by the tracking and acquiring module.

Preferably, the network terminal further includes a storage module and a processor.

The storage module is configured to store management configuration information;

the processor is configured to read the management configuration information from the storage module, and to update the management configuration information of the storage module according to a management configuration instruction received by the GUI management module; and the GUI management module is further configured to control the display module to display the management configuration information read from the storage module by the processor, and receive the management configuration instruction from the user through the input module.

Preferably, the management configuration instruction includes a user management instruction of the network terminal and a network parameter configuration instruction of the network terminal.

Preferably, the running information required by the running information query instruction includes at least one of the following information:

network connection status information, network connection traffic, a number of access user, a VOIP application call record, and user account information.

Preferably, when the running information required by the running information query instruction is the user account information, the processor is further configured to ask the ISP server for the user account information, and receive the user account information returned by the ISP server; and the GUI management module is further configured to control the display module to display the user account information received by the processor.

In the technical solution provided by embodiments of the disclosure, the network terminal tracks and acquires network connection startup information and VOIP application information and displays the information; a query instruction is received from a user, and the information required by the running information query instruction is acquired and displayed. Thus, the specific information about startup and running of the network terminal can be acquired promptly and intuitively. Troubleshooting can be performed conveniently and quickly without accessing the network terminal through other terminal equipment when a network fails.

Moreover, the network terminal can present local management configuration information to the user intuitively, and updates the local management configuration information according to the management configuration instruction from the user. The operation is simple and convenient, which improves the user experience.

DETAILED DESCRIPTION

The disclosure is further described below in conjunction with the accompanying drawings and embodiments in detail.

Figure 1:
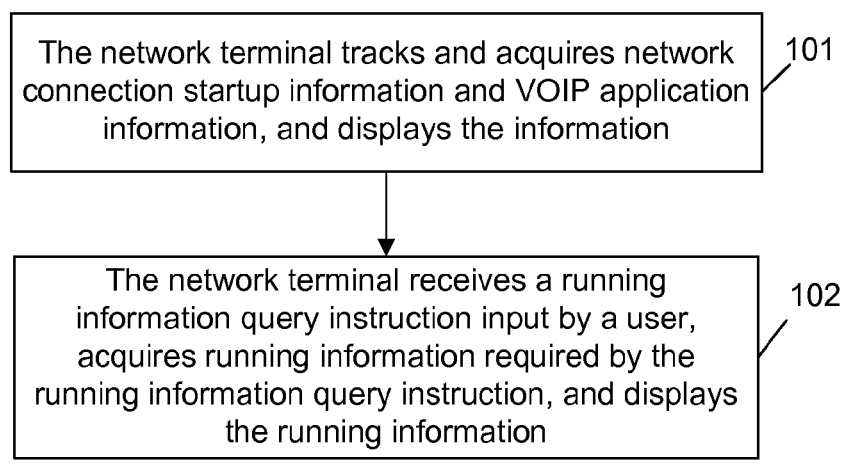
FIG. 1 illustrates the implementation flow of a display method of a network terminal according to an embodiment of the disclosure.

FIG. 1 illustrates the implementation flow of a display method of a network terminal according to an embodiment of the disclosure. As shown in FIG. 1, the method includes the following steps:

In Step 101, the network terminal tracks and acquires network connection startup information and VOIP application information, and displays the information.

Preferably, the VOIP application information includes VOIP application startup information and current contact number of VOIP application.

Preferably, the network connection startup information and the VOIP application information are acquired by respectively tracking a port allocated for the network connection and a port allocated for the VOIP application.

In Step 102, the network terminal receives a running information query instruction input by a user, acquires running information required by the running information query instruction, and displays the running information.

Preferably, the running information required by the running information query instruction includes at least one of the following information: network connection status information, network connection traffic, a number of access users of the network terminal, a VOIP application call record, and user account information.

Preferably, the network connection status information includes wired network connection status information and wireless network connection status information.

Preferably, the network connection status information, the network connection traffic and the number of access users of the network terminal are acquired by tracking the port allocated for the network connection; the VOIP application call record is acquired by tracking the port allocated for the VOIP application.

Preferably, the running information required by the running information query instruction may further include storage device connection status information.

Preferably, the storage device connection status information is acquired by tracking an external storage interface of the network terminal.

Preferably, when the information required by a user query instruction is user account information, the method may further include the following step:

the network terminal asks an Internet Service Provider (ISP) server for the user account information, and displays the user account information after the ISP server returns the user account information.

Preferably, the step further includes that:

the network terminal displays local management configuration information, receives a management configuration instruction input by the user, and updates the local management configuration information according to the management configuration instruction.

Preferably, the management configuration instruction includes a user management instruction of the network terminal and a network parameter configuration instruction of the network terminal.

In Steps 101 and 102, the network terminal can receive an instruction input by the user through a keyboard and present information to the user through a multimedia display screen; or, the network terminal can receive an instruction input by the user through a touch display screen and present the information to the user through the touch display screen.

Figure 2:
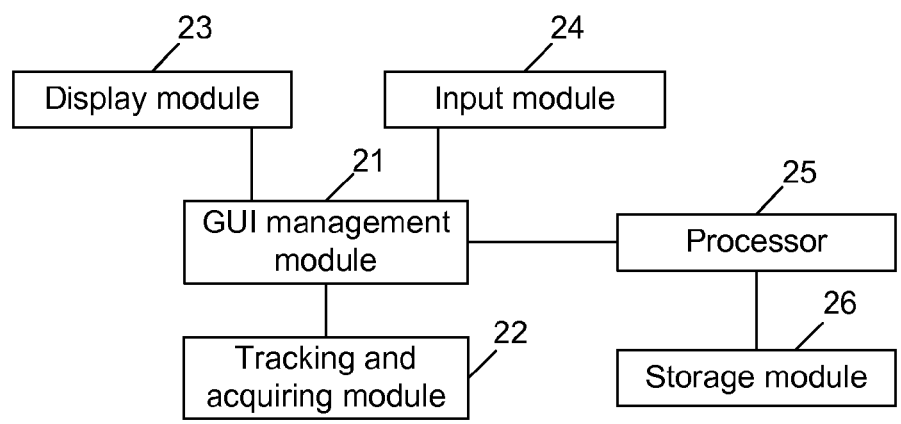
FIG. 2 illustrates a structure diagram of a network terminal according to an embodiment of the disclosure.

FIG. 2 illustrates a structure diagram of a network terminal according to an embodiment of the disclosure. As shown in FIG. 2, the network terminal includes a tracking and acquiring module 21, a GUI management module 22, a display module 23 and an input module 24.

The tracking and acquiring module 21 is configured to track and acquire network connection startup information and VOIP application information, and to track and acquire running information required by a running information query instruction received by the GUI management module 22.

The GUI management module 22 is configured to: receive the running information query instruction input by a user through the input module 24; control the display module 23 to display the network connection startup information and the VOIP application information acquired by the tracking and acquiring module 21; and control the display module to display the running information required by the running information query instruction, which is tracked and acquired by the tracking and acquiring module 21.

Preferably, the network terminal further includes a processor 25 and a storage module 26.

The processor 25 is configured to read management configuration information from the storage module 26, and to update the management configuration information of the storage module 26 according to a management configuration instruction received by the GUI management module 22.

The storage module 26 is configured to store the management configuration information.

The GUI management module 22 is further configured to control the display module 23 to display the management configuration information read from the storage module 26 by the processor 25, and receive the management configuration instruction from the user through the input module 24.

Preferably, the management configuration instruction includes a user management instruction of the network terminal and a network parameter configuration instruction of the network terminal.

Preferably, the running information required by the running information query indication includes: network connection status information, network connection traffic, a number of access users, a VOIP application call record, and user account information.

Preferably, when the running information required by the running information query instruction input by the user is the user account information, the processor 25 is further configured to ask the ISP server for the user account information, and receive the user account information returned by the ISP server; and the GUI management module 22 is further configured to control the display module 23 to display the user account information received by the processor 25.

The above are only the preferred embodiments of the disclosure, and are not intended to limit the scope of protection of the claims of the disclosure.

INDUSTRIAL APPLICABILITY

In the technical solutions provided by embodiments of the disclosure, the network terminal tracks and acquires network connection startup information and VOIP application information, and displays the information; a query instruction is received from a user, and the information required by the running information query instruction is acquired and displayed. Thus, the specific information about the startup and running of the network terminal can be acquired promptly and intuitively. Troubleshooting can be performed conveniently and quickly without connecting to the network terminal via other terminal devices when a network fails. Moreover, the network terminal can present local management configuration information to the user intuitively, and updates the local management configuration information according to a management configuration instruction from the user. The operation is simple and convenient, which improves the user experience.

The invention claimed is:

1. A display method for a network terminal, comprising:
    by the network terminal, tracking and acquiring network connection startup information and Voice Over Internet Protocol (VOIP) application information of the network terminal, and displaying the information; wherein the network terminal comprises a port allocated for a network connection and a port allocated for a VOIP application; the network connection startup information and the VOIP application information are acquired by respectively tracking the port allocated for the network connection and the port allocated for the VOIP application; and
    by the network terminal, receiving a running information query instruction input by a user, tracking and acquiring running information of the network terminal required by the running information query instruction, and displaying the running information; wherein the running information is acquired by tracking the port allocated for the network connection and/or the port allocated for the VOIP application.

2. The method according to claim 1, further comprising:
    by the network terminal, displaying local management configuration information, receiving a management configuration instruction input by the user, and updating the local management configuration information according to the management configuration instruction.

3. The method according to claim 2, wherein the management configuration instruction comprises a user management instruction of the network terminal and a network parameter configuration instruction of the network terminal.

4. The method according to claim 3, wherein the running information required by the running information query instruction comprises at least one of the following information: network connection status information, network connection traffic, a number of access users of the network terminal, a VOIP application call record, and user account information.

5. The method according to claim 4, further comprising:
    when the running information required by the running information query instruction is the user account information, asking, by the network terminal, an Internet Service Provider (ISP) server for the user account information, and displaying the user account information after the ISP server returns the user account information.

6. The method according to claim 2, wherein the running information required by the running information query instruction comprises at least one of the following information: network connection status information, network connection traffic, a number of access users of the network terminal, a VOIP application call record, and user account information.

7. The method according to claim 6, further comprising:
    when the running information required by the running information query instruction is the user account information, asking, by the network terminal, an Internet Service Provider (ISP) server for the user account information, and displaying the user account information after the ISP server returns the user account information.

8. The method according to claim 1, wherein the running information required by the running information query instruction comprises at least one of the following information: network connection status information, network connection traffic, a number of access users of the network terminal, a VOIP application call record, and user account information.

9. The method according to claim 8, further comprising:
    when the running information required by the running information query instruction is the user account information, asking, by the network terminal, an Internet Service Provider (ISP) server for the user account information, and displaying the user account information after the ISP server returns the user account information.

10. The method according to claim 8, wherein the running information required by the running information query instruction further comprises storage device connection status information, the storage device connection status information is acquired by tracking an external storage interface of the network terminal.

11. A network terminal, comprising: a display, a Graphical User Interface (GUI) manager, a tracker and acquirer, and an input module including a hardware circuit, wherein
    the tracker and acquireer is configured to track and acquire network connection startup information and VOIP application information of the network terminal, and to track and acquire running information of the network terminal required by a running information query instruction received by the GUI manager; wherein the network terminal comprises a port allocated for a network connection and a port allocated for a VOIP application; the network connection startup information and the VOIP application information are acquired by respectively tracking the port allocated for the network connecton and the port allocated for the VOIP application; running information is acquired by tracking the port allocated for the network connection and/or the port allocated for the VOIP application; and the GUI manager is configured to: receive the running information query instruction from a user through the input module; control the display to display the network connection startup information and the VOIP application information acquired by the tracker and acquirer; and control the display to display the running information required by the running information query instruction, which is tracked and acquired by the tracker and acquirer.

12. The network terminal according to claim 11, further comprising a storage and a processor, wherein the storage is configured to store management configuration information; and the processor is configured to read the management configuration information from the storage, and to update the management configuration information of the storage according to a management configuration instruction received by the GUI manager; and wherein the GUI manager is further configured to control the display to display the management configuration information read from the storage by the processor, and to receive the management configuration instruction from the user through the input module.

13. The network terminal according to claim 12, wherein the management configuration instruction comprises a user management instruction of the network terminal and a network parameter configuration instruction of the network terminal.

14. The network terminal according to claim 13, wherein the running information required by the running information query instruction comprises at least one of the following information:

network connection status information, network connection traffic, a number of access users, a VOIP application call record, and user account information.

15. The network terminal according to claim 14, wherein when the running information required by the running information query instruction is the user account information, the processor is further configured to ask the ISP server for the user account information, and to receive the user account information returned by the ISP server; and the GUI manager is further configured to control the display to display the user account information received by the processor.

16. The network terminal according to claim 12, wherein the running information required by the running information query instruction comprises at least one of the following information:

network connection status information, network connection traffic, a number of access users, a VOIP application call record, and user account information.

17. The network terminal according to claim 16, wherein when the running information required by the running information query instruction is the user account information, the processor is further configured to ask the ISP server for the user account information, and to receive the user account information returned by the ISP server; and the GUI manager is further configured to control the display to display the user account information received by the processor.

18. The network terminal according to claim 11, wherein the running information required by the running information query instruction comprises at least one of the following information:

network connection status information, network connection traffic, a number of access users, a VOIP application call record, and user account information.

19. The network terminal according to claim 18, wherein when the running information required by the running information query instruction is the user account information, the processor is further configured to ask the ISP server for the user account information, and to receive the user account information returned by the ISP server; and the GUI manager is further configured to control the display to display the user account information received by the processor.

20. The method according to claim 18, wherein the running information required by the running information query instruction further comprises storage device connection status information, the storage device connection status information is acquired by tracking an external storage interface of the network terminal.

* * * * *